US012162511B2

(12) United States Patent
Sakamoto et al.

(10) Patent No.: US 12,162,511 B2
(45) Date of Patent: Dec. 10, 2024

(54) VEHICLE CONTROL DEVICE AND ELECTRONIC CONTROL SYSTEM

(71) Applicant: HITACHI ASTEMO, LTD., Ibaraki (JP)

(72) Inventors: Hideyuki Sakamoto, Hitachinaka (JP); Teppei Hirotsu, Tokyo (JP); Taisuke Ueta, Tokyo (JP); Hidetatsu Yamamoto, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 566 days.

(21) Appl. No.: 17/425,525

(22) PCT Filed: Jan. 15, 2020

(86) PCT No.: PCT/JP2020/000947
§ 371 (c)(1),
(2) Date: Jul. 23, 2021

(87) PCT Pub. No.: WO2020/166253
PCT Pub. Date: Aug. 20, 2020

(65) Prior Publication Data
US 2022/0089179 A1  Mar. 24, 2022

(30) Foreign Application Priority Data

Feb. 13, 2019  (JP) .................................. 2019-023118

(51) Int. Cl.
*B60W 60/00*  (2020.01)
*G01S 13/86*  (2006.01)
(Continued)

(52) U.S. Cl.
CPC ......... *B60W 60/001* (2020.02); *G01S 13/867* (2013.01); *G01S 13/931* (2013.01);
(Continued)

(58) Field of Classification Search
CPC .. B60W 60/001; G01S 13/867; G01S 13/931; G01S 7/40; G01S 7/417; G01S 13/865;
(Continued)

(56) References Cited

U.S. PATENT DOCUMENTS

2005/0289365 A1* 12/2005 Bhandarkar .......... G06F 1/3287
713/300
2017/0080950 A1* 3/2017 Pink .................... G06F 11/0796
(Continued)

FOREIGN PATENT DOCUMENTS

JP  2017-513162 A  5/2017
JP  2017-207348 A  11/2017
(Continued)

OTHER PUBLICATIONS

Machine Translation WO-2018198547-A1 (Year: 2018).*

*Primary Examiner* — Anne Marie Antonucci
*Assistant Examiner* — Wesam N M N Almadhrhi
(74) *Attorney, Agent, or Firm* — Volpe Koenig

(57) ABSTRACT

There are realized a vehicle control device and an electronic control system with high reliability capable of safely shifting control even when an operation abnormality occurs in a sensor around a vehicle or an arithmetic block that processes sensor fusion. The vehicle control device includes a first arithmetic block which performs sensor fusion processing based on pieces of raw data output from a plurality of surrounding environment sensors, a second arithmetic block which performs sensor fusion processing based on pieces of object data generated by processing the pieces of raw data output from the plurality of surrounding environment sensors, and a third arithmetic block which diagnoses an output result of the first arithmetic block by using the output result of the first arithmetic block and an output result of the second arithmetic block.

11 Claims, 5 Drawing Sheets

(51) Int. Cl.
  *G01S 13/931* (2020.01)
  *G06N 3/04* (2023.01)
  *G06V 10/776* (2022.01)
  *G06V 10/80* (2022.01)
  *G06V 10/82* (2022.01)
  *G06V 20/56* (2022.01)

(52) U.S. Cl.
  CPC ............ *G06N 3/04* (2013.01); *G06V 10/776* (2022.01); *G06V 10/803* (2022.01); *G06V 10/82* (2022.01); *G06V 20/56* (2022.01)

(58) Field of Classification Search
  CPC ......... G01S 17/86; G01S 17/931; G06N 3/04; G06V 10/776; G06V 10/803; G06V 10/82; G06V 20/56; G08G 1/16
  See application file for complete search history.

(56) References Cited

U.S. PATENT DOCUMENTS

| | | |
|---|---|---|
| 2017/0336504 A1 | 11/2017 | Kai |
| 2018/0068206 A1* | 3/2018 | Pollach .................. G06V 20/56 |
| 2020/0034354 A1 | 1/2020 | Horita et al. |
| 2020/0070847 A1 | 3/2020 | Horiguchi et al. |

FOREIGN PATENT DOCUMENTS

| | | | |
|---|---|---|---|
| JP | 2018-060281 A | 4/2018 | |
| JP | 2018-184021 A | 11/2018 | |
| WO | WO-2018198547 A1 * | 11/2018 | ........ B60W 30/0956 |

* cited by examiner

VEHICLE CONTROL DEVICE AND ELECTRONIC CONTROL SYSTEM

TECHNICAL FIELD

The present invention relates to a vehicle control device and an electronic control system of a self-driving system.

BACKGROUND ART

In order to realize an advanced self-driving system, a self-driving electronic control unit (ECU) which is a higher-level control device that controls self-driving needs to have a function of detecting an object around a vehicle body by mounting an arithmetic processing device (hereinafter, referred to as a microcomputer) inside the ECU and performing sensor fusion processing and deciding a trajectory of the vehicle so as to avoid contact with a surrounding object. Here, the sensor fusion processing is a technique that realizes an advanced recognition function that cannot be obtained from a single sensor by integrally processing detection data of two or more sensors having different detection principles, for example, captured images of cameras and radars. In recent years, as self-driving has been advanced, improvement in accuracy of surrounding environment recognition and reduction in latency of sensor side processing are needed. As a measure for realization, a control method for performing sensor fusion processing by inputting pieces of raw data output from sensors to a neural network mounted on an arithmetic block in the self-driving ECU and outputting object data has been studied. When the above method is performed, a diagnosis mechanism for validity of a sensor fusion output result by centralized processing is needed.

As such a technique, for example, there is a technique described in PTL 1.

CITATION LIST

Patent Literature

PTL 1: JP 2017-513162 A

SUMMARY OF INVENTION

Technical Problem

The technique of PTL 1 compares object-based fused data output from each surrounding sensor and raw object data by fusing the pieces of raw data with each other, and discards and recalculates the data when a difference therebetween is out of an error tolerance range.

Here, when a result of the raw data fusion and a result of the object data fusion are compared, detectable objects may be different due to a difference between data processing methods. Thus, a difference occurs between the detected objects even though the outputs are normal depending on a scene. Accordingly, it is difficult to diagnose probabilities of pieces of data by merely comparing the result of the raw data fusion and the result of the object data fusion. However, such a point is not considered in PTL 1. The present invention has been made in view of the above problems, and an object of the present invention is to accurately diagnose output data from a sensor or an arithmetic block that performs sensor fusion processing in a self-driving control system.

Solution to Problem

The present invention includes a plurality of means for solving the above problems. For example, one aspect of the present invention adopts the following configuration.

A vehicle control device includes a first arithmetic block which performs sensor fusion processing based on pieces of raw data output from a plurality of surrounding environment sensors, a second arithmetic block which performs sensor fusion processing based on pieces of object data generated by processing the pieces of raw data output from the plurality of surrounding environment sensors, and a third arithmetic block which diagnoses an output result of the first arithmetic block by using the output result of the first arithmetic block and an output result of the second arithmetic block.

Advantageous Effects of Invention

According to one aspect of the present invention, it is possible to realize a vehicle control device and an electronic control system capable of improving safety.

DESCRIPTION OF EMBODIMENTS

Figure 1:
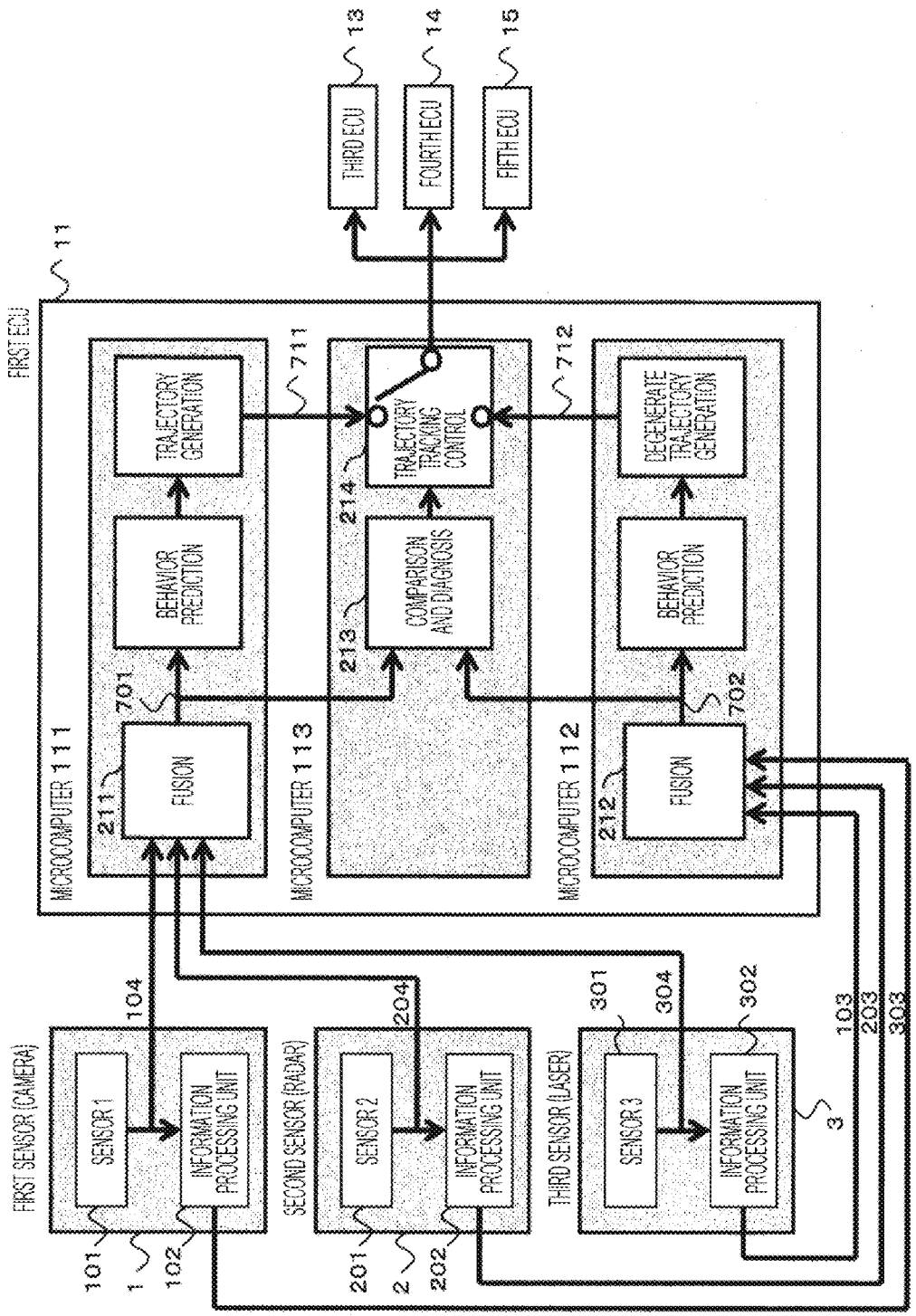
FIG. 1 is a diagram illustrating an internal configuration of a vehicle control device (first ECU) 11 according to a first embodiment and connections of sensors and actuators.

Hereinafter, embodiments of the present invention will be described with reference to the accompanying drawings. The embodiments are merely examples for realizing the present invention, and do not limit the technical scope of the present invention. In the drawings, common components are denoted by the same reference signs.

(Configuration of Self-Driving System)

First, a configuration (not illustrated) of a self-driving system (vehicle control system) to which the present invention is applied will be described. The self-driving system according to the present invention is a vehicle control device that controls a behavior of a vehicle based on information obtained from a surrounding environment sensor.

In the present invention, the surrounding environment sensor is assumed to be, for example, a camera, a lidar, a radar, a laser, or the like, but may be another sensor. In the present invention, the vehicle control system is connected to an actuator group provided in the vehicle, and controls the vehicle by driving the actuator group. The actuator group is, for example, brake control, engine control, and power steering control, but is not limited thereto.

First Embodiment

Hereinafter, a first embodiment of the present invention will be described with reference to FIGS. 1 to 3.

FIG. 1 is a diagram illustrating an internal configuration of a vehicle control device (first ECU) 11 according to the first embodiment and connections of sensors and actuators.

As described above, in recent years, in order to realize self-driving, a vehicle control device needs to generate a highly accurate trajectory by inputting sensor data with higher accuracy and a large information amount and performing sensor fusion.

There is a plurality of sensors used for recognizing a surrounding environment of a host vehicle. For example, a camera for obtaining image data, a lidar or a radar for obtaining distance data, and the like are used. The camera has high reliability in color recognition of a road surface sign or the like, but has a problem that recognition is difficult in the case of rain, fog, or strong sunlight.

On the other hand, for example, radar has a problem of low resolution while distance detection is useful. Each sensor has advantages and disadvantages, and it is not possible to recognize the surrounding environment with only one sensor.

Here, the sensor fusion is a technique that realizes an advanced recognition function that cannot be obtained from a single sensor by integrally processing detection data of two or more sensors, for example, captured images of cameras and radars. When the sensor fusion is performed so far, high reliability has been secured by preprocessing (object data conversion) and sensor fusion (object data fusion) of pieces of sensor data. On the other hand, recently, there is an increasing need to perform the sensor fusion of pieces of raw data obtained from the sensors in order to perform more advanced surrounding environment recognition. The detailed description will be presented below.

A large amount of pieces of raw data on which the preprocessing is not performed are input from the sensors to the vehicle control device 11 in the present embodiment. A microcomputer 111 included in the vehicle control device 11 performs raw data fusion processing based on the pieces of raw data input from the sensors. Specifically, an arithmetic block 211 of the microcomputer 111 generates a raw data fusion result 701 by performing data fusion processing on pieces of raw data 104, 204, and 304 obtained from the sensors.

In addition to the pieces of raw data, pieces of object data are input from the sensors to the vehicle control device 11. In a first sensor 1, a second sensor 2, and a third sensor 3, information processing units 102, 202, and 302 which are, respectively, included in the sensors generate pieces of object data 103, 203, and 303 of the pieces of sensor data, respectively. A microcomputer 112 included in the vehicle control device 11 performs object data fusion processing based on the pieces of object data input from the sensors.

Specifically, an arithmetic block 212 of the microcomputer 112 generates an object data fusion result 702 by performing data fusion processing on the pieces of object data 103, 203, and 303 obtained from the sensors. As an example, a flow related to the fusion will be described by using the following sensors.

For example, a camera 1 is a sensor module incorporating a sensor 101 and the information processing unit 102. The raw data acquired from the sensor 101 is transmitted to the information processing unit 102 and the arithmetic block 211 in the first ECU. The information processing unit 102 generates the object data based on the raw data acquired from the sensor 101. Thereafter, the object data 103 is transmitted to the arithmetic block 212 in the first ECU.

A radar 2 is a sensor module incorporating a sensor 201 and the information processing unit 202. The raw data acquired from the sensor 201 is transmitted to the information processing unit 202 and the arithmetic block 211 in the first ECU. The information processing unit 202 generates the object data 203 based on the raw data acquired from the sensor 201. Thereafter, the object data 203 is transmitted to the arithmetic block 212 in the first ECU.

A laser 3 is a sensor module incorporating a sensor 301 and the information processing unit 302. The raw data acquired from the sensor 301 is transmitted to the information processing unit 302 and the arithmetic block 211 in the first ECU. The information processing unit 302 generates the object data based on the raw data acquired from the sensor 301. Thereafter, the object data 303 is transmitted to the arithmetic block 212 in the first ECU. Examples of the information processing units include a microcomputer and a field programmable gate array (FPGA).

As described above, the pieces of raw data of the pieces of data obtained from the sensors are input to the arithmetic block 211. The arithmetic block 211 fuses the pieces of raw data input from the sensors to generate the raw data fusion result 701 that is surrounding object data. Thus, the arithmetic block 211 needs to be able to collectively process a large amount of pieces of data. The raw data fusion result 701 is output by machine learning. The machine learning here refers to, for example, generate the raw data fusion result 701 obtained by performing the sensor fusion of the pieces of raw data by inputting the pieces of raw data from the sensors to a neural network (NN) or a deep neural network (DNN) provided in the arithmetic block 211. Here, since the raw data fusion result 701 calculated by machine learning using the NN and the DNN as examples includes a large amount of pieces of data, a highly accurate trajectory can be generated. The arithmetic block 211 transmits the generated raw data fusion result 701 to a microcomputer 113. The microcomputer 111 predicts a behavior of an object around the host vehicle based on the raw data fusion result 701, generates trajectory data 711 of the host vehicle based on the result of the behavior prediction, and transmits the trajectory data to a trajectory tracking control unit 214.

The arithmetic block 212 is mounted on the microcomputer 112 with high reliability having a lockstep function. Here, the lockstep microcomputer 112 includes a CPU and a memory. A CPU subsystem of each system is controlled by a duplex control circuit so as to operate completely synchronously in units of clocks, and thus, the lockstep microcomputer has high reliability.

The microcomputer 112 handles the pieces of object data individually preprocessed by the camera 1, the radar 2, and the laser 3.

An object data fusion result 702 is generated by performing the object data fusion on the pieces of object data 103, 203, and 303 obtained by performing preprocessing in the information processing units 102, 202, and 302 provided in the sensors such as the camera 1, the radar 2, and the laser 3 by the arithmetic block 212.

Thereafter, the microcomputer 112 transmits the generated object data fusion result 702 to the microcomputer 113. The microcomputer 112 predicts a behavior of an object around the host vehicle based on the object data fusion result 702, generates trajectory data of the host vehicle based on the result of the behavior prediction, and transmits the trajectory data 712 to the trajectory tracking control unit 214.

The present embodiment illustrates an example of the vehicle control device including the first microcomputer 111 on which the arithmetic block 211 is mounted, the second microcomputer 112 on which the arithmetic block 212 is mounted, and the third microcomputer 113 on which the arithmetic block 213 for performing comparison and diagnosis is mounted.

The raw data fusion result 701 obtained by the sensor fusion in the arithmetic block 211 and the object data fusion result 702 obtained by the sensor fusion in the arithmetic block 212 are diagnosed by a comparison diagnosis function of the arithmetic block 213. Trajectory tracking control is performed based on the diagnosis result of the arithmetic block 213. A specific diagnosis will be described later.

The control tracking control unit 214 generates a trajectory tracking control command based on trajectory information calculated by a trajectory generation unit of the microcomputer 111 or a trajectory generation unit of the microcomputer 112. When the arithmetic block 211 is normal as the result of the comparison and diagnosis, the trajectory tracking control unit 214 generates and transmits a control command to actuator control ECUs 13, 14, and 15 such that the host vehicle is tracked based on the trajectory data 711 generated by the microcomputer 111.

When the arithmetic block 211 is diagnosed as abnormal, the control tracking control unit 214 generates and transmits a control command to the actuator control ECUs 13, 14, and 15 such that the host vehicle tracks the trajectory data 712 generated by the microcomputer 112.

Figure 2:
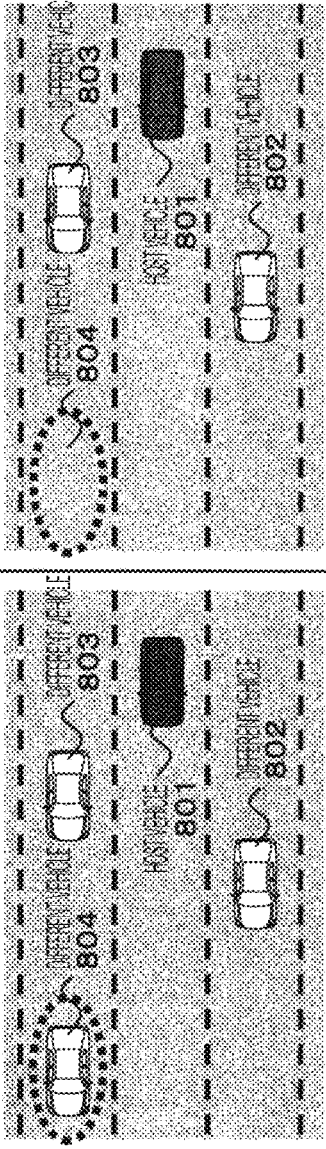
FIG. 2 is a diagram illustrating a method of diagnosing a sensor fusion result in the first embodiment.

FIG. 2 is a diagram illustrating a method of diagnosing a sensor fusion result in the first embodiment.

FIG. 2 illustrates an example of a sensor fusion result of a host vehicle 801 when different vehicles 802 and 803 are traveling near the host vehicle 801 and a different vehicle 804 is traveling far from the host vehicle 801.

FIGS. 2-1a and 2-1b on the left side of FIG. 2 illustrate the raw data fusion result 701 obtained by the sensor fusion in the arithmetic block 211 based on the pieces of raw data obtained from the sensors. FIGS. 2-2a and 2-2b on the right side of FIG. 2 illustrate the object data fusion result 702 obtained by the sensor fusion in the arithmetic block 212 based on the pieces of data processed by the arithmetic blocks of the sensors.

Here, the upper part of FIG. 2 illustrates a case where the diagnosis result is normal, and the lower part illustrates a case where the diagnosis result is abnormal. Specific aspects of the diagnosis will be described below.

As described above, information processing is performed on the pieces of sensor data obtained from the sensors 101, 201, and 301 by the information processing units 102, 202, and 302 provided in the sensors. Information on the pieces of object data 103, 203, and 303 of the sensors obtained by the information processing is transmitted to the arithmetic block 212. The arithmetic block 212 generates the object data fusion result 702 by fusing the obtained pieces of object data 103, 203, and 303.

The sensor fusion performed by the arithmetic block 212 is performed by using the arithmetic blocks (processors) or the lockstep microcomputer provided on the sensor side. In order to verify the probability, the lockstep microcomputer desirably takes measures such as adopting the pieces of object data output from the sensors by majority decision.

However, in the object data fusion result 702, as illustrated in FIG. 2-2a, a highly reliable output can be expected for recognition of the different vehicles 802 and 803 traveling around the host vehicle. On the other hand, since the pieces of data are processed in advance for ensuring the reliability, it may be difficult to recognize the different vehicle (for example, the different vehicle 804 in FIG. 2-2a) traveling far from the host vehicle.

Here, in the arithmetic block 211, the pieces of data (for example, the pieces of data 104, 204, and 304) obtained from the sensors are directly obtained, the raw data fusion processing is performed, and the raw data fusion result 701 is output. An example of the output is illustrated in FIG. 2-1a. Since the arithmetic block 211 handles a large amount of pieces of raw data from the sensors, an information amount of an object group that can be recognized also increases.

Here, the object group refers to objects present around the vehicle, and is, for example, a vehicle or a pedestrian. Thus, not only the different vehicles 802 and 803 traveling near the host vehicle can be recognized, but also the different vehicle 804 traveling far from the host vehicle which cannot be recognized in FIG. 2-1a can be recognized in FIG. 2-2a.

Basically, the object data fusion result 702 generated by the sensor fusion in the arithmetic block 212 has a smaller peripheral information amount that can be recognized than the data fusion result 701 output by the arithmetic block 211 to which the large amount of pieces of raw data is input. Here, the raw data fusion result 701 generated by the arithmetic block 211 is, for example, an LVDS communication level and is a data amount of 10 Mbps or more. On the other hand, the object fusion result 702 generated by the arithmetic block 212 is, for example, less than 10 Mbps of a CAN-FD communication level.

In order to determine the probabilities of the recognition and the outputs of the raw data fusion result 701 and the object fusion result 702 of the arithmetic block 211 and the arithmetic block 212, when the raw data fusion result 701 and the object fusion result 702 are simply collated with each other, as described above, the determination of diagnosis result: abnormal is constantly performed in the diagnosis due to the fact that a difference is generated in a data amount and an object group that can be recognized.

Thus, in the present embodiment, the arithmetic block 212 diagnoses whether or not the arithmetic block 211 can recognize surrounding environment information similar to nearby surrounding environment information recognized by the arithmetic block 212 on the assumption that the arithmetic block has high reliability for the recognition of the different vehicles near the host vehicle by using a flow using a plurality of processors and a lockstep microcomputer.

Specifically, when the object fusion result 702 output by the arithmetic block 212 is included in the raw data fusion result 701 output by the arithmetic block 211, the determination of diagnosis result: normal is performed. When the raw data fusion result 702 output by the arithmetic block 212 is not included in the raw data fusion result 701 output by the arithmetic block 211, the arithmetic block 213 performs the determination of diagnosis result: abnormal.

Hereinafter, a specific description will be given using FIG. 2 as an example.

In the upper diagram of FIG. 2, the different vehicle 804 far from the host vehicle is recognized in the raw data fusion result 701 of the arithmetic block 211 (FIG. 2-1a), whereas the arithmetic block 212 does not recognize the different vehicle 804 (FIG. 2-2a). However, since the vehicles traveling near the host vehicle can be recognized by both the arithmetic blocks, the determination of diagnosis result: normal is performed.

On the other hand, in the lower diagram of FIG. 2, the arithmetic block 212 recognizes the different vehicle 802 near the host vehicle (FIG. 2-2b), whereas the arithmetic block 211 does not recognize the different vehicle 802 (FIG. 2-1b). Thus, when the object data fusion result 702 generated in the arithmetic block 212 is not included in the raw data fusion result 701 generated in the arithmetic block 211, the arithmetic block 213 performs the determination of diagnosis result: abnormal. In this case, it is determined that there is an error in the raw data fusion result 701, and it is determined that the object fusion result 702 output from the arithmetic block 212 with high reliability is correct.

When there is an object that can be recognized in the object data fusion result 702 calculated by the arithmetic block 212 but cannot be recognized in the raw data fusion result 701 calculated by the arithmetic block 211, the arithmetic block 213 determines that the diagnosis result is abnormal. When an object that can be recognized in the object data fusion result 702 calculated by the arithmetic block 212 can be recognized in the raw data fusion result 701 calculated by the arithmetic block 211, it is determined that the diagnosis result is normal.

Here, when the arithmetic block 213 diagnoses that the diagnosis result of the arithmetic block 211 is abnormal, there is a possibility that a failure or a defect occurs in the sensor.

When the occurrence of the defect described above is detected, preferably, the arithmetic block 213 or the arithmetic block 211 prohibits the output of the raw data fusion result 701. Alternatively, the arithmetic block 211 stops outputting the raw data fusion result. The vehicle travels according to the trajectory of the vehicle output by the arithmetic block 212. The reason is that since the probabilities of the pieces of data of the plurality of sensors is determined by majority decision for the output of the arithmetic block 212, a highly reliable output can still be obtained even though one sensor fails. Highly reliable trajectory tracking control can be performed by continuously using the output result of the arithmetic block 212.

More preferably, degenerate trajectory data 712 may be generated in the microcomputer 112, and the vehicle may select a degenerate operation. The degenerate operation will be described in detail later.

In this diagnosis method, the sensor fusion result 701 output by the arithmetic block 211 is diagnosed on the assumption that the sensor fusion result output by the arithmetic block 212 is correct. In order to set the output result of the arithmetic block 212 to be correct, it is desirable that the vehicle control device and system have the following configurations.

While the fusion processing (arithmetic block 211) using machine learning (for example, DNN) is generation based on experience and matching, the fusion by the arithmetic block 212 is desirably generated by a rule-based algorithm. The fusion processing using machine learning is based on a causal relation (for example, DNN) that fluctuates in real time, and the fusion processing by the arithmetic block 212 is based on a predetermined correlation (for example, a lockstep microcomputer). Thus, it is possible to diagnose the raw data fusion result based on the trajectory calculated by the system independent of the fusion processing by the machine learning. As a result, it is possible to realize diagnosis of the raw data fusion result with higher reliability.

The arithmetic block 212 is desirably executed by the lockstep microcomputer with high reliability. The probability of the raw data fusion result 701 used in the trajectory generation of the arithmetic block 211 can be diagnosed based on the object fusion result 702 output from the arithmetic block 212 with high reliability. As a result, it is possible to diagnose the raw data fusion result with high reliability.

The arithmetic block 212 desirably takes a majority decision based on outputs from a plurality of sensors and electronic control processors (that use a principle, a method, and an algorithm different from those of the arithmetic block 211). According to the above configuration, the arithmetic block 212 can perform calculation by using probable data, and has high reliability.

The arithmetic block 212 needs to use an electronic control processor different from the arithmetic block 211. Even when one sensor or one electronic control processor fails, it is possible to perform correct determination by majority decision by utilizing other sensors and electronic control processors.

Power is desirably supplied to the plurality of sensors that supplies the pieces of sensor data to the vehicle control device 11 from at least two or more batteries. For example, the camera 1 receives power supply from a battery A, and the radar 2 receives power supply from a battery B. With this configuration, the vehicle control device 11 can realize the redundancy of the power supply, and can generate the vehicle trajectory with higher reliability.

Figure 3:
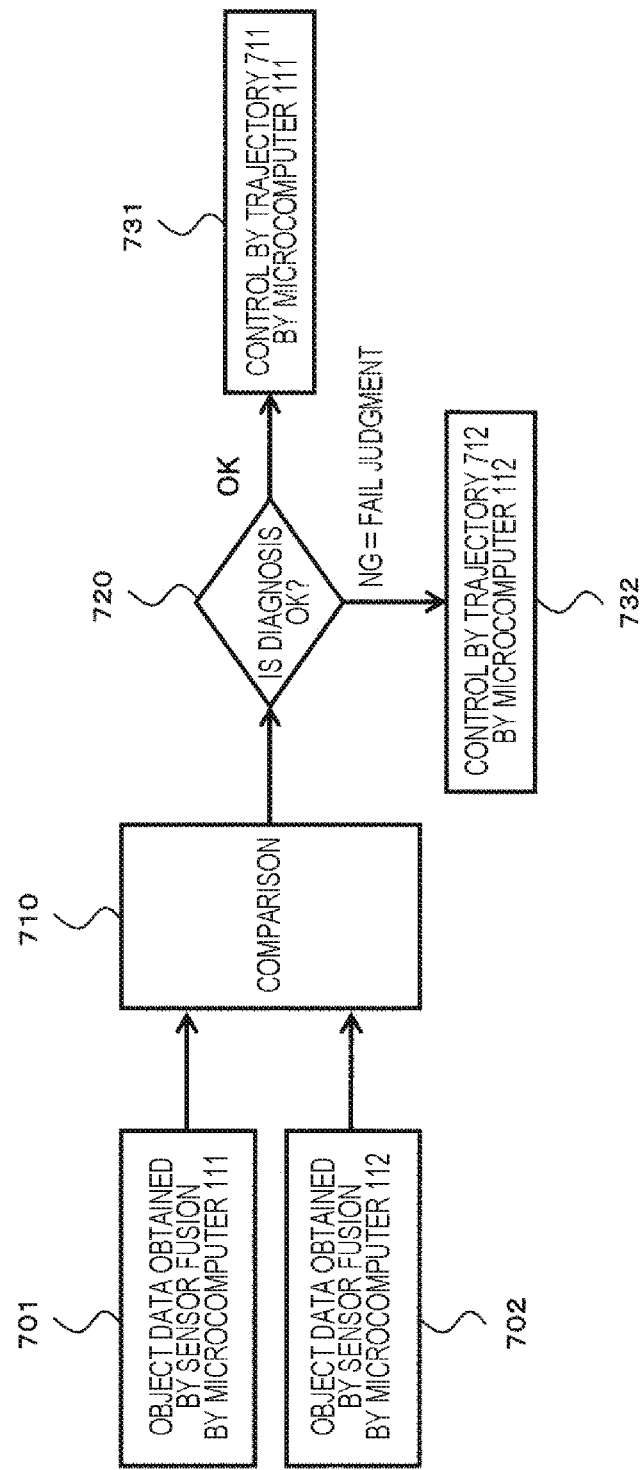
FIG. 3 is a diagram illustrating a diagnosis and a control flow based on a diagnosis result in the first embodiment.

FIG. 3 is a diagram illustrating a control flow based on the diagnosis and the diagnosis result in the first embodiment. The fusion result 701 by the arithmetic block 211 provided in the microcomputer 111 and the fusion result 702 by the arithmetic block 212 provided in the microcomputer 112 are compared by the arithmetic block 213 provided in the microcomputer 113.

Here, when it is determined that the diagnosis result is normal, the sensor fusion and the trajectory data 712 generated in the microcomputer 111 are adopted. In order to perform the trajectory tracking control in the arithmetic block 214 based on the data of the raw data fusion result 701 calculated in the microcomputer 111, an actuator control command for the trajectory tracking control is transmitted from the vehicle control device 11 to the actuator side.

On the other hand, when the raw data fusion result 701 generated by the sensor fusion output by the arithmetic block 211 is not included in the object data fusion result 702 generated by the sensor fusion output by the arithmetic block 212, it is diagnosed as abnormal. Here, when the arithmetic block 213 diagnoses that the calculation result of the arithmetic block 211 is abnormal, the sensor fusion and the trajectory data 712 generated in the microcomputer 112 are adopted, and an actuator drive command (actuator control command) for the trajectory tracking control is transmitted to the actuator ECU by the arithmetic block 214 based on this data.

Here, in the arithmetic block 213, when it is diagnosed that the output of the raw data fusion result 701 calculated by the arithmetic block 211 is abnormal, there is a possibility that abnormality occurs in each sensor. There is a high risk of continuing traveling in such a state. Thus, when it is determined that the diagnosis result is abnormal, the trajectory data 712 generated by the illustrated microcomputer 112 can be generated as a degenerate trajectory. Here, the degenerate operation refers that emergency avoidance for avoiding malfunction such that the self-driving system can be continued when one key component is damaged during driving and a function thereof is stopped or safe retraction such that self-driving for a certain period is continued and a driver takes over driving safely and smoothly even when the function is stopped due to the damage of the key component. The degenerate trajectory refers to a safety retraction trajectory and an emergency retraction trajectory generated to realize the above-described operation. With the above configuration, when the arithmetic block 213 detects that the failure has occurred in the sensor, since the microcomputer 112 generates the degenerate trajectory, the vehicle can stop safely.

In the present embodiment, the arithmetic block 211 and the arithmetic block 212 continuously perform calculations for generating trajectories by different algorithms in parallel. Thus, even though the arithmetic block 213 diagnoses that the raw data fusion result 701 of the arithmetic block 211 is abnormal, it is possible to switch between the trajectories generated from the object data fusion result 702 by the arithmetic block 212, and it is possible to suppress the occurrence of a time lag.

When advanced arithmetic processing performed in the arithmetic block 211 is performed in the arithmetic block 212 (in the case of a completely redundant system), both the arithmetic block 211 and the arithmetic block 212 need to be advanced processors that can withstand a heavy arithmetic load. However, when the degenerate trajectory is generated, since such an advanced processor is not required, the calculation can be performed by a processor with a low cost. Thus, when the arithmetic block 212 performs only the generation of the degenerate trajectory, the cost of the vehicle control device can be reduced.

With this configuration, it is possible to prevent unstable trajectory tracking control due to the abnormality of the sensor, or each microcomputer or each arithmetic block provided in the sensor.

The present embodiment includes the first arithmetic block (arithmetic block 211) that performs the sensor fusion processing based on the pieces of raw data output from the plurality of surrounding environment sensors, the second arithmetic block (arithmetic block 212) that performs the sensor fusion processing based on the pieces of object data generated by processing the pieces of raw data output from the plurality of surrounding environment sensors, and the third arithmetic block (arithmetic block 213) that diagnoses the output result of the first arithmetic block by using the output result of the first arithmetic block and the output result of the second arithmetic block.

The output result of the arithmetic block 211 is assumed to have a larger information amount than the output result of the arithmetic block 212. However, when the output results of the arithmetic block 211 and the arithmetic block 212 are simply compared, since a difference occurs due to a difference in the information amount between these output results even though these output results are normal, most of the outputs may be discarded. Thus, the present embodiment has the above-described configuration, and thus, it is possible to determine the output result of the arithmetic block 212 having a large information amount based on the output result of the arithmetic block 211 with high reliability.

Preferably, when the object group around the vehicle output as the sensor fusion result by the second arithmetic block (arithmetic block 212) is not included in the object group around the vehicle output as the sensor fusion result by the first arithmetic block (arithmetic block 211), the third arithmetic block (arithmetic block 213) determines that the first arithmetic block (arithmetic block 211) is abnormal. When the object group around the vehicle output as the sensor fusion result by the second arithmetic block (arithmetic block 212) is included in the object group around the vehicle output as the sensor fusion result by the first arithmetic block (arithmetic block 211), the third arithmetic block (arithmetic block 213) determines that the first arithmetic block (arithmetic block 211) is abnormal. With the above configuration, it is possible to diagnose the output of the arithmetic block 211 based on the pieces of data with high reliability and a small information amount output by the arithmetic block 212, and it is possible to diagnose that the first arithmetic block is normal as long as the arithmetic blocks can output necessary minimum information even though the arithmetic block 211 has information larger than that of the arithmetic block 212. As a result, there is an effect that it is possible to generate the trajectory by using the information of the arithmetic block 211 including high accuracy information while securing reliability.

Second Embodiment

Figure 4:
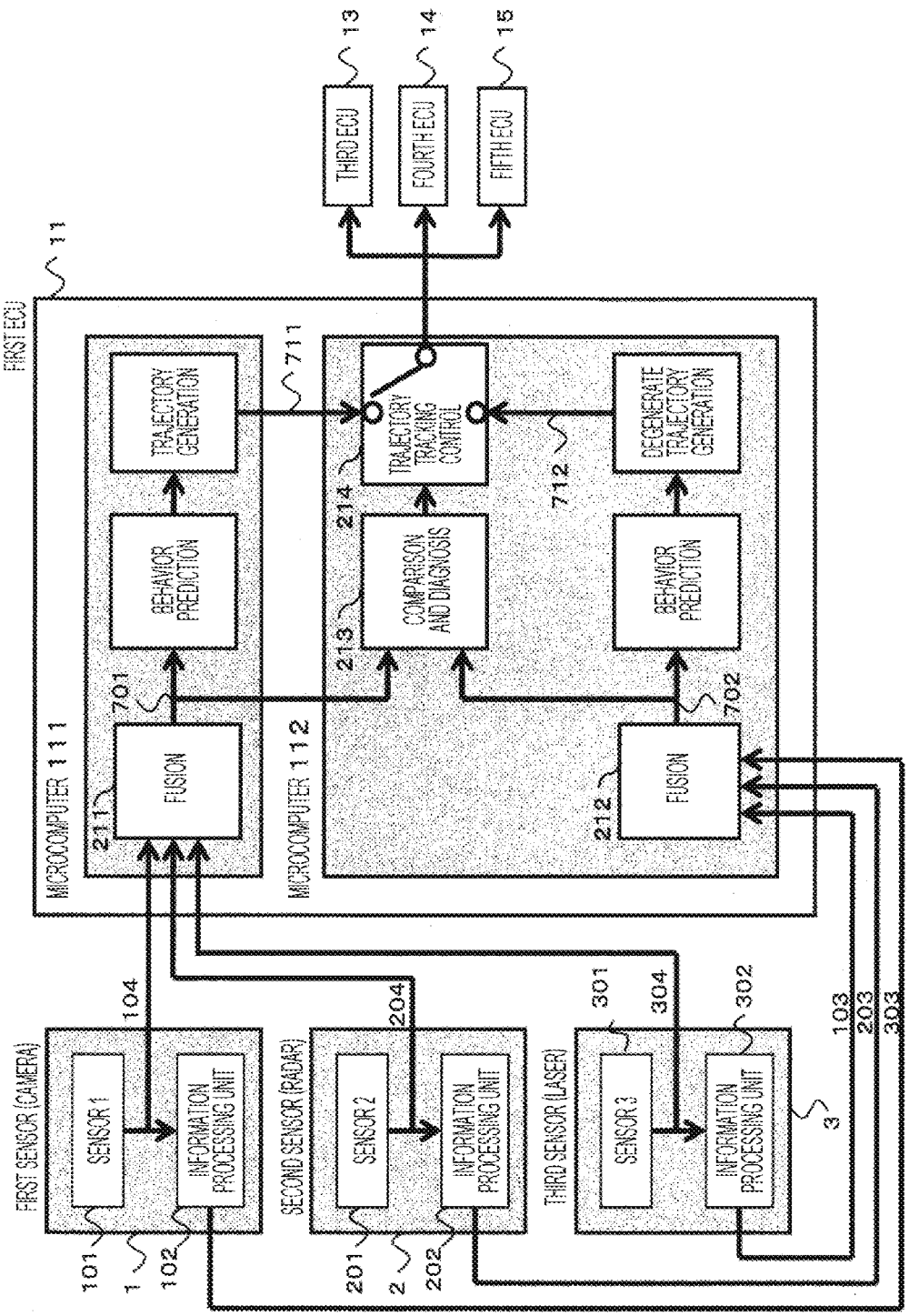
FIG. 4 is a diagram illustrating an internal configuration of a vehicle control device (first ECU) 11 according to a second embodiment and connections of sensors and actuators.

FIG. 4 is a diagram illustrating an internal configuration (in particular, the microcomputer 111 and the microcomputer 112) of the vehicle control device (first ECU) 11 according to the first embodiment and connections of sensors and actuators.

In the present embodiment, all the calculations relating to the trajectory generation of the self-driving system are performed in the first ECU as in the first embodiment. The arithmetic block 211 of the microcomputer 111 outputs the raw data fusion result 701 by performing the raw data fusion.

Here, unlike the first embodiment, the present embodiment includes the arithmetic block 212 and the arithmetic block 213 that output the object fusion results in the microcomputer 112.

With such a configuration, the arithmetic block 211 and the arithmetic block 212 can be calculated by different algorithms. Thus, the arithmetic block 213 can collate the pieces of sensor data with higher reliability. Accordingly, the first arithmetic block can generate the trajectory by using highly reliable data. Normally, the microcomputer with high reliability is used as the microcomputer 112 that generates the object data fusion result in order to ensure safety. Thus, reliability can also be expected in the arithmetic block 213. The description of the same configuration as that of the first embodiment will be omitted.

Third Embodiment

Figure 5:
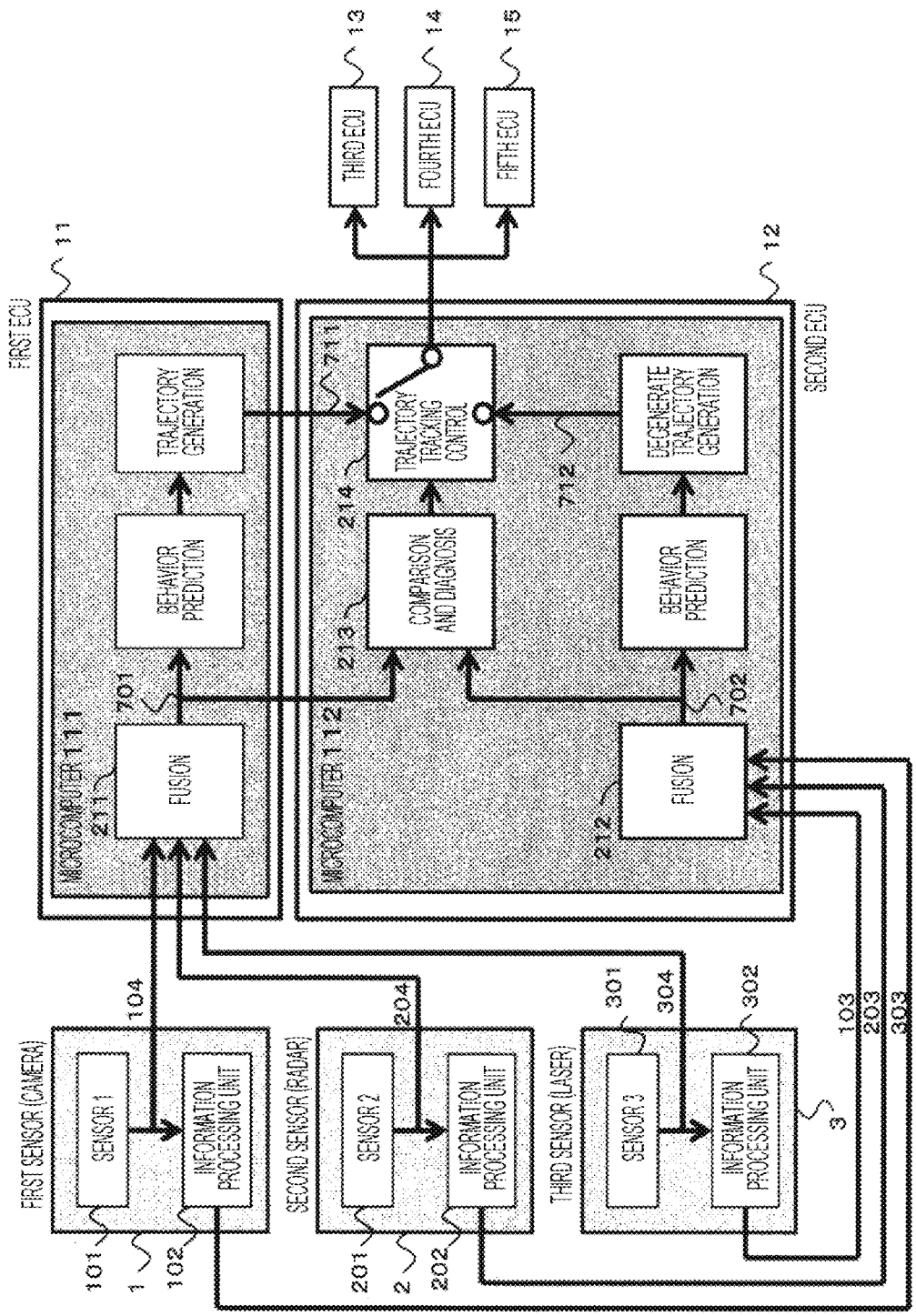
FIG. 5 is a diagram illustrating internal configurations of a vehicle control device (first ECU) 11 and a vehicle control device (second ECU) 12 according to a third embodiment, and connections of sensors and actuators.

FIG. 5 is a diagram illustrating internal configurations of the vehicle control device (first ECU) 11 and a vehicle control device (second ECU) 12 according to the first embodiment, and connections of sensors and actuators.

In the present embodiment, the raw data fusion result 701 is calculated in the arithmetic block 211 of the microcomputer 111 provided in the first ECU. The microcomputer 112 of the second ECU includes the arithmetic block 212 that calculates the object data fusion result 702 and the arithmetic block 213. That is, the outputs of the raw data fusion result 701 and the object data fusion 702 are performed by different ECUs.

With this configuration, the electronic control device has an effect of enabling redundancy of a power supply and the like and highly reliable diagnosis.

Here, the first ECU and the second ECU may have completely different functions. For example, the first ECU may be a self-driving vehicle control ECU, and the second ECU may be an automatic parking or ADAS ECU. The description of the same configuration as that of the first embodiment will be omitted.

As described above, the inventors have described the present invention by taking the first to third embodiments as the examples. The sensor mounted on the illustrated vehicle is an example of a sensor applicable to the present invention, and does not limit the sensor of the vehicle to which the present invention is applicable.

As described above, according to the present embodiment, it is possible to realize the vehicle control device and the electronic control system with high reliability.

REFERENCE SIGNS LIST 1 camera
2 radar
3 laser
11 vehicle control device
13 third ECU
14 fourth ECU
15 fifth ECU
101 sensor 1
201 sensor 2
301 sensor 3
102 information processing unit of sensor 1
202 information processing unit of sensor 2
302 information processing unit of sensor 3
103 object data output from first sensor
203 object data output from second sensor
303 object data output from third sensor
104 raw data output form first sensor
204 raw data output form second sensor
304 raw data output form third sensor
211 arithmetic block 1
212 arithmetic block 2
213 arithmetic block 3 (diagnosis block)
214 control command generation unit
701 raw data fusion result
702 object data fusion result
711 trajectory data generated based on raw data fusion result
712 trajectory data generated based on object data fusion result

The invention claimed is:

1. An electronic control unit (ECU) for controlling a self-driving vehicle, the ECU comprising:
a first processor, wherein the first processor is configured to:
receive a raw data from a plurality of sensors that monitor an environment surrounding the self-driving vehicle,
perform a first fusion processing on the raw data to generate a first fusion result,
generate a first prediction of behaviors of one or more vehicles adjacent to the self-driving vehicle based on the first fusion result, and
generate a first trajectory for the self-driving vehicle based on the first prediction;
a second processor, wherein the second processor is configured to:
receive the raw data from the plurality of sensors that monitor the environment surrounding the self-driving vehicle,
perform a second fusion processing on the raw data to generate a second fusion result, wherein the second fusion result contains less data than the first fusion result,
generate a second prediction of the behaviors of the one or more vehicles adjacent to the self-driving vehicle based on the second fusion result, and
generate a second trajectory for the self-driving vehicle based on the second prediction; and
and a third processor, wherein the third processor is configured to:
receive the first fusion result and the second fusion result,
perform a comparison of the first fusion result and the second fusion result, and
control the self-driving vehicle according to either the first trajectory or the second trajectory based on the comparison.

2. The ECU according to claim 1, wherein the comparison indicates an abnormal operating condition when an object is included in the first fusion result and not in the second fusion result.

3. The ECU according to claim 2, wherein the comparison indicates a normal operating condition when an object found in the first fusion result is also found in the second fusion result.

4. The ECU according to claim 3, wherein:
the self-driving vehicle is controlled based on the second trajectory when the comparison indicates that the abnormal operating condition, and
the self-driving vehicle is controlled based on the first trajectory when the comparison indicates that the normal operating condition is abnormal.

5. The ECU according to claim 2, wherein the third processor is further configured to
prohibit an output of the first fusion result calculated by the comparison indicates the abnormal operating condition.

6. The ECU according to claim 1, wherein at least one of the first fusion processing or the second fusion processing utilizes a machine learning model.

7. The ECU according to claim 6, wherein the machine learning model is a deep neural network.

8. The ECU according to claim 1, wherein the second processor includes a lockstep function.

9. The ECU according to claim 1, wherein the second trajectory is a degenerate trajectory.

10. The ECU according to claim 1, wherein power supplies of the first processor and the second processor are independent of each other.

11. A method for controlling a self-driving vehicle, the method comprising:
receiving, by a first processor, a raw data from a plurality of sensors that monitor an environment surrounding the self-driving vehicle;
performing, by the first processor, a first fusion processing on the raw data to generate a first fusion result;
generating, by the first processor, a first prediction of behaviors of one or more vehicles adjacent to the self-driving vehicle based on the first fusion result;
generating, by the first processor, a first trajectory for the self-driving vehicle based on the first prediction;
receiving, by a second processor, the raw data from the plurality of sensors that monitor the environment surrounding the self-driving vehicle;
performing, by the second processor, a second sensor fusion processing on the raw data to generate a second fusion result, wherein the second fusion result contains less data than the first fusion result;
generating, by the second processor, a second prediction of the behaviors of the one or more vehicles adjacent to the self-driving vehicle based on the second fusion result;
generating, by the second processor, a second trajectory for the self-driving vehicle based on the second prediction;

receiving, by a third processor, the first fusion result and the second fusion result;

performing, by the third processor, a comparison of the first fusion result and the second fusion result; and controlling, by the third processor, the self-driving vehicle according to either the first trajectory or the second trajectory based on the comparison.

\* \* \* \* \*